Nov. 14, 1950        J. C. WILLIAMS        2,529,753
VERTICAL BORING MACHINE
Filed Nov. 20, 1948                       2 Sheets-Sheet 1
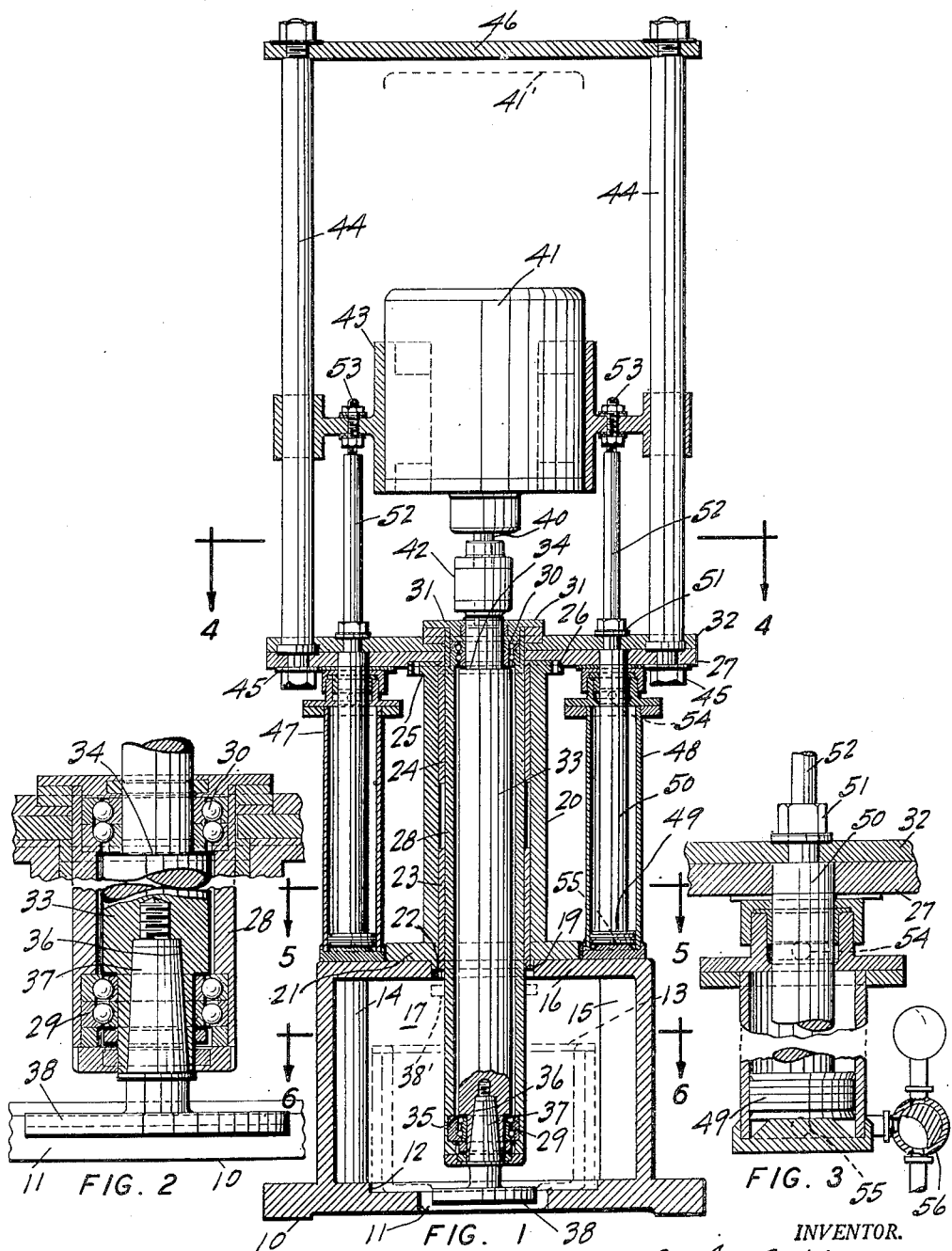
INVENTOR.
John C. Williams
BY Philip A. Fridell
Attorney Patented Nov. 14, 1950

2,529,753

UNITED STATES PATENT OFFICE 2,529,753

VERTICAL BORING MACHINE

John C. Williams, Oakland, Calif.

Application November 20, 1948, Serial No. 61,274

5 Claims. (Cl. 77—4)

This invention relates to improvements in vertical boring machines and particularly to machines for boring bearing liners, and provides a tool which will bore bearing liners with the utmost accuracy because of the rigid mounting of the spindle and the dual fluid control of the boring head.

This machine provides a spindle which is rigidly supported almost up to the cutter so that the spindle may be considered as absolutely rigid, the spindle sleeve being supported in long bearings and with the spindle perfectly supported therein at both ends.

The objects and advantages of the invention are as follows:

First, to provide a boring machine with a spindle which is rigidly supported against flexure.

Second, to provide a boring machine as outlined with a motor carrying head which is raised and lowered hydraulically.

Third, to provide a boring machine as outlined in which the motor carrying head is raised and lowered through oppositely spaced cylinders.

Fourth, to provide a boring machine as outlined in which the motor carrying head is effectively and accurately guided to maintain absolute alignment of the spindle.

Fifth, to provide a boring machine with a base provided with a fixture seat to accurately center a fixture carrying a bearing.

Sixth, to provide a boring machine as outlined with a hollow base which has a sufficiently large frontal passage to admit a fixture having a bearing mounted therein.

In describing the invention reference will be made to the accompanying drawings, in which:

Fig. 1 is a sectional front elevation of the invention.

Fig. 2 is an enlarged section through the spindle bearings.

Fig. 3 is an enlarged section through the head and base of one of the cylinders.

Figure 4:
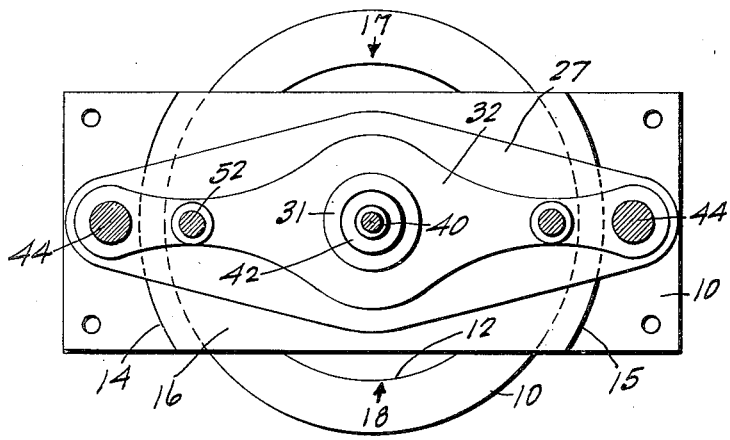
Fig. 4 is a section taken on line 4—4 of Fig. 1.
Figure 5:
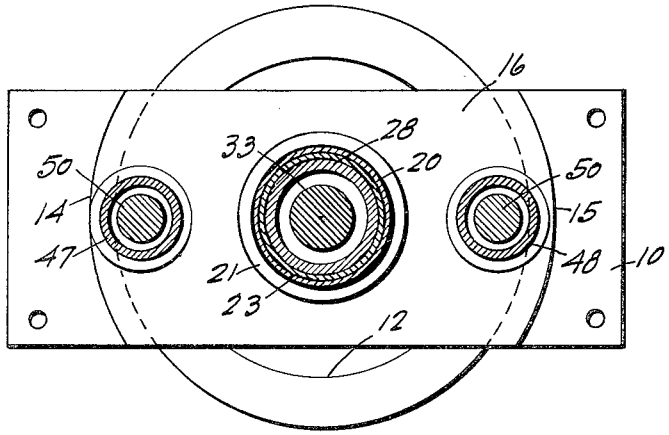
Fig. 5 is a section taken on line 5—5 of Fig. 1.
Figure 6:
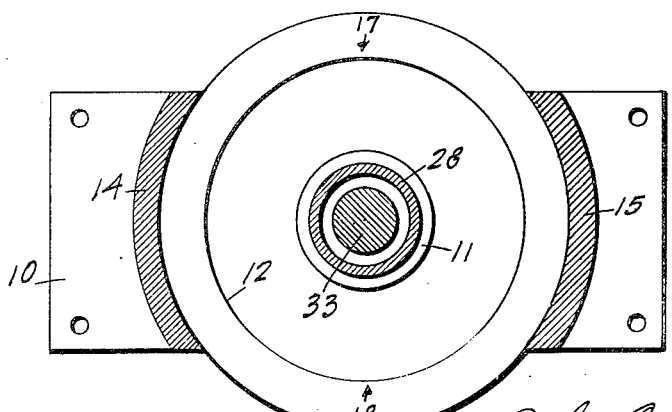
Fig. 6 is a section taken on line 6—6 of Fig. 1.

The boring machine consists of a base plate 10 having a central bore 11 and counterbore 12, the counterbore being of such diameter as to closely receive and center the base of a boring fixture 13 made to suit the specific bearing which is to be bored, and having arcuate side walls 14 and 15 and a top wall 16, leaving passages 17 and 18 through the front and back respectively for introducing and removing the fixture 13 at will, and a bore 19 is formed in the top wall 16 to axially center the spacer 20 which has a base plate 21 provided with an axial pilot 22 to fit in this bore, the base plate 21 being suitably secured to the top wall.

The spacer 20 is a sleeve-like member provided with a bushing at each end as indicated at 23 and 24 and terminates at its upper end in a flange 25 which fits in a counterbore 26 formed in the head plate 27.

A spindle sleeve 28 is slidable in the bearings 23 and 24 and has the respective ball bearings 29 and 30 mounted within at its upper and lower ends with the upper end of the sleeve counterbored to receive the ball bearing and secured by means of a flanged member 31 and by means of which the sleeve is secured to the lifter plate 32.

Rotatably mounted within the sleeve 28 is the spindle 33 which is supported by the ball bearings 29 and 30 and terminating at the upper and lower ends to form the respective shoulders 34 and 35 for axial retention within the sleeve, and having an axial taper bore 36 for the taper shank 37 of a cutter 38. The upper end of this spindle is coupled to the shaft 40 of a motor 41 through a coupling 42, and the motor is mounted in a bracket 43 which is slidable on the tie rods 44 which are anchored in the head plate 27 as indicated at 45 with the upper ends of the tie rods anchored in the cap plate 46.

Cylinders 47 and 48 are mounted on the respective sides of the top wall 16 and each has a piston 49 with integral piston rod 50 which is anchored at its upper end in the lifter plate 32 as indicated at 51 and with an extension 52 thereof anchored in the motor bracket 43 as indicated at 53, the cylinders having combined inlet and discharge ports 54 and 55 at the respective ends for a fluid under pressure, conventional controls being provided for the fluid.

For operation, fluid under pressure is admitted through the port 55 to raise the pistons and therewith the entire boring head including the plate 32, and cap 46, motor 41, sleeve 28 and spindle 33 with the cutter 38 raised to the position 38' and the motor raised to the position 41'. A fixture 13 with bearing to be bored in position is passed through the frontal passage 18 and seated in the counterbore 12 which the base of the fixture exactly fits. The motor is set in operation and fluid is admitted through the port 54 and allowed to discharge through the port 55 through the control valve 56 which is adjusted to pass the fluid in conformity with the desired axial travel of the cutting tool, the sleeve 28 with the spindle 33 rotating therein moving downwardly to slowly advance the cutter through the bearing.

When the boring operation has been completed, the valve 56 is turned to admit fluid under pressure to the lower part of the cylinders to raise the spindle, spindle sleeve, and motor to their uppermost position, after which the fixture with its bearing is removed ready for the next bearing.

I claim:

1. A boring machine comprising; a base; a head plate; a cylindrical spacer for supporting said head plate and supported by said base; diametrically located cylinders mounted between said base and said head plate and a piston for each cylinder and having a piston rod projecting upwardly through the head plate; a pair of spaced vertical slide bars supported by said head plate and projecting upwardly; a motor supported by said piston rods and guided by said slide bars; a spindle sleeve slidable in said cylindrical spacer and secured against axial or rotative movement relative to said motor; a spindle rotatable in said spindle sleeve and retained against axial movement therein; and means for controlling flow of fluid under pressure to and from said cylinders; said spindle terminating at the lower end of said spindle sleeve and having means for mounting a cutting tool axially therein; whereby said spindle is supported throughout its length by said spindle sleeve irrespective of advancement or retraction of the cutting tool in a work piece.

2. A structure as defined in claim 1; said base having a bottom plate and a top plate and supporting walls; said base plate having an axial bore to clear a tool mounted in said spindle; said cylinders and cylindrical spacer being supported on said top plate and supporting said head plate and having passages for said piston rods; a lifter plate resting on said head plate when in lowered position and fixed to said piston rods intermediate their lengths and slidable on said slide bars; and a bracket supporting said motor and supported at the upper ends of said piston rods and slidable on said slide bars and comprising the support for said motor by said piston rods.

3. A structure as defined in claim 1; said cylindrical spacer being bushed to slidably receive said sleeve; said sleeve having an antifriction radial thrust bearing at each, its upper and lower ends with said spindle rotatable in said bearings and maintained against axial movement in said sleeve thereby.

4. A structure as defined in claim 1; said base having a bottom plate and a top plate and supporting walls; said base plate having an axial bore to clear a tool mounted in said spindle; said cylinders and cylindrical spacer being supported on said top plate and supporting said head plate and having passages for said piston rods; a lifter plate resting on said head plate when in lowered position and fixed to said piston rods intermediate their lengths and slidable on said slide bars; and a bracket supporting said motor and supported at the upper ends of said piston rods and slidable on said slide bars and comprising the support for said motor by said piston rods; said cylindrical spacer being bushed to slidably receive said sleeve; said sleeve having an antifriction radial thrust bearing at each, its upper and lower ends with said spindle rotatable in said bearings and maintained against axial movement in said sleeve thereby.

5. A boring machine comprising; a base having a bottom wall, a top wall, and intervening side walls, and a first axial bore formed through said top wall; a cylindrical spacer having a second axial bore and seated on said top wall and centered in said first axial bore; a head plate supported on the upper end of said spacer and having a third axial bore coincident with that of the spacer; a cylindrical sleeve slidable in said second and third axial bores; a spindle mounted in bearings at the respective ends of the sleeve and retained against axial movement in the sleeve; diametrically spaced cylinders supported on said top wall and each having a piston rod and bores formed in said head plate for slidably receiving said piston rods; diametric guide posts supported by said head plate and projecting vertically thereabove and having a cross member at the upper end to provide rigidity; a lifter plate slidable on said guide posts and having said piston rods fixed thereto and restable on said head plate when said pistons are in their lowermost position; upward extensions on said piston rods; a cradle supported on said upward extensions and having bearing extensions slidable on said guide posts, and a motor carried by said cradle and having its shaft operatively connected to said spindle; and means for controlling flow of fluid under pressure to and from said cylinders; said spindle being supported throughout its length irrespective of the advancement or retraction of a cutter mounted in the lower end of the spindle, thereby providing maximum rigidity in boring operations.

JOHN C. WILLIAMS.

REFERENCES CITED

The following references are of record in the file of this patent:

UNITED STATES PATENTS

| Number | Name | Date |
| --- | --- | --- |
| 2,273,870 | Kampmeier et al. | Feb. 24, 1942 |
| 2,388,621 | Sirp et al. | Nov. 6, 1945 |